(12) United States Patent
Summers et al.

(10) Patent No.: US 6,885,523 B1
(45) Date of Patent: Apr. 26, 2005

(54) ACTUATOR-ARM FREE, FLEXIBLE CIRCUIT SUSPENSION ASSEMBLY FOR DISK DRIVES

(75) Inventors: Robert Summers, Temecula, CA (US); Warren Coon, Temecula, CA (US)

(73) Assignee: Magnecomp Corporation, Temecula, CA (US)

(*) Notice: Subject to any disclaimer, the term of this patent is extended or adjusted under 35 U.S.C. 154(b) by 410 days.

(21) Appl. No.: 09/362,149

(22) Filed: Jul. 28, 1999

(51) Int. Cl.[7] ............................................... G11B 21/16
(52) U.S. Cl. ................................................... 360/244.3
(58) Field of Search .......................... 360/244.3, 245.7, 360/234.5, 246

(56) References Cited

U.S. PATENT DOCUMENTS

| | | | | |
|---|---|---|---|---|
| 4,670,804 A | * | 6/1987 | Kant et al. .................. | 360/102 |
| 5,422,764 A | * | 6/1995 | McIlvanie ................. | 360/97.01 |
| 5,673,484 A | * | 10/1997 | Masaichi et al. ............ | 360/104 |
| 5,771,136 A | * | 6/1998 | Girard .......................... | 360/104 |
| 5,815,349 A | * | 9/1998 | Frater .......................... | 360/104 |
| 5,838,517 A | * | 11/1998 | Frater et al. ................. | 360/104 |
| 5,862,010 A | * | 1/1999 | Simmons et al. ......... | 360/97.01 |
| 6,046,883 A | * | 4/2000 | Miller ...................... | 360/245.7 |

* cited by examiner

*Primary Examiner*—David Davis
(74) *Attorney, Agent, or Firm*—Louis J. Bachand

(57) ABSTRACT

A low cost, simplified disk drive suspension not requiring an actuator arm for movement is provided comprising a load beam having at its proximate end attachment structure comprising a mounting hole fixed to an actuator spindle and at its distal end terminal structure adapted to support a slider overlying a disk and having a lift cam and limiters, and a conductor supported by the load beam, the conductor comprising a flexible conductive laminate metal layer flexure and limiter at the load beam terminal structure, undue movement of the flexure and flexure tongue being controlled by the limiters.

25 Claims, 3 Drawing Sheets

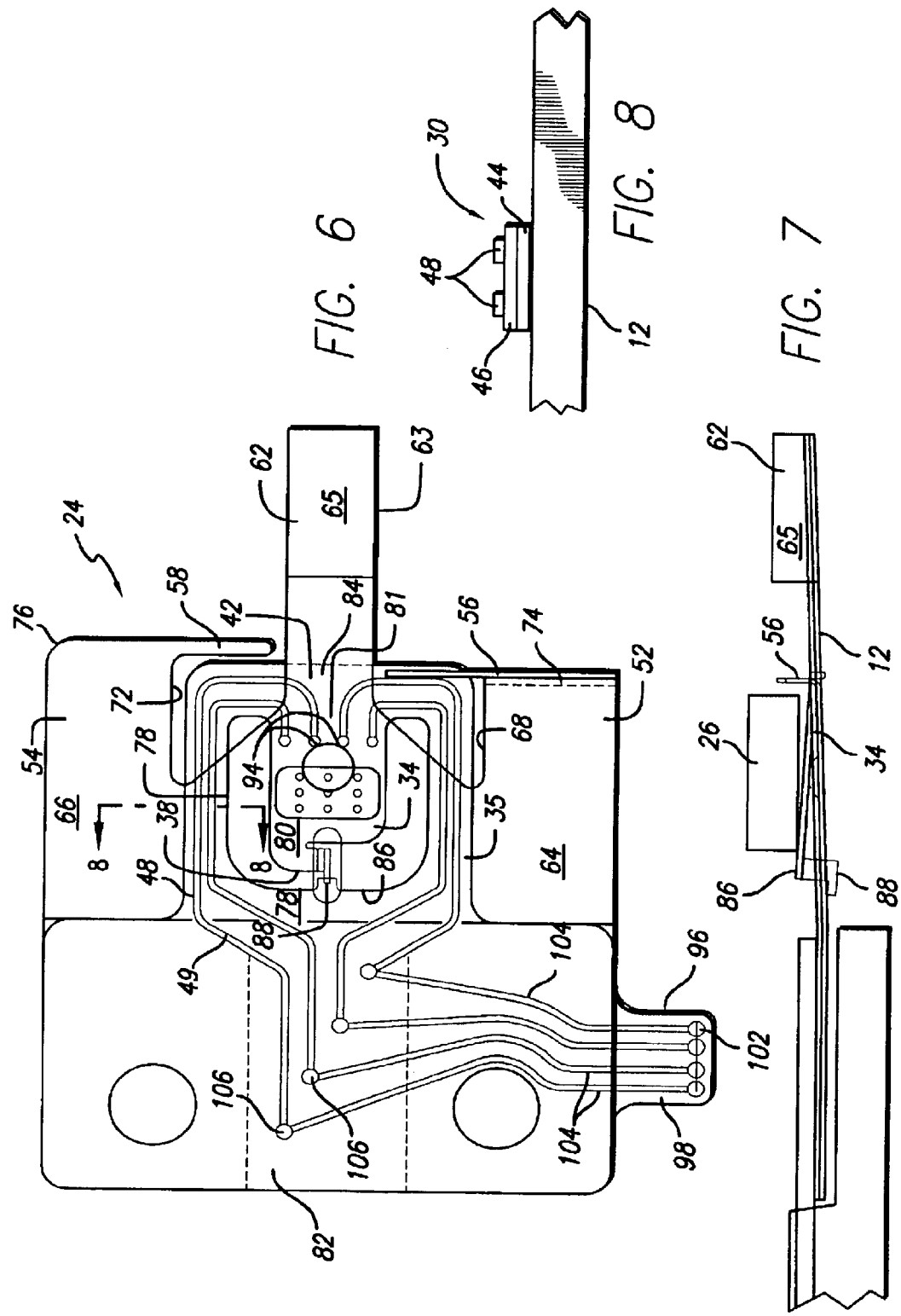

ACTUATOR-ARM FREE, FLEXIBLE CIRCUIT SUSPENSION ASSEMBLY FOR DISK DRIVES

BACKGROUND OF THE INVENTION

1. Field of the Invention

This invention relates to disk drive suspensions, and more particularly to an actuator arm-free mountable load beam and wireless conductor disk drive suspension assemblies. The invention uses the flexible conductive laminates to electrically couple the slider to the device electronics and to form the flexure and limiters to control the extent of flexure and flexure tongue travel. The load beam has an attachment structure that connects the load beam directly to the actuator spindle without the use of an actuator arm or E-block. The invention thus provides the lowest cost full-featured disk drive suspension.

2. Related Art

The need for ever-cheaper, yet full-featured disk drive suspensions has brought numerous innovations, but the ultimate suspension has yet to be provided. The use of flexible conductive laminates has opened the possibility of forming the flexure of the metal layer of the laminate, but problems remain in achieving low cost assembly and optimum use of the laminates.

SUMMARY OF THE INVENTION

It is an object of the invention, therefore, to provide a novel disk drive suspension that simplifies assembly, reduces per-part costs, and is full featured. It is a further object to provide a disk drive suspension in which the load beam attaches directly to the actuator spindle, supports a flexure formed of the flexible conductive laminate, provides a flexure limiter and lift cam integrated with the load beam and a further limiter formed of the flexure tongue and flexure frame.

These and other objects of the invention, to become apparent hereinafter, are realized in a disk drive suspension comprising a load beam having at its proximate end attachment structure fixed to an actuator spindle and at its distal end terminal structure adapted to support a slider overlying a disk, and a conductor supported by the load beam, the conductor comprising a flexible conductive laminate defining a flexure at the load beam terminal structure.

In this and like embodiments, typically, the load beam attachment structure comprises a mounting hole defined in the load beam proximate end, the actuator spindle being received within the mounting hole in fixed relation, the flexible conductive laminate flexure has a proximate end and a distal end and comprises a spring metal layer, a dielectric film layer and at least one pair of conductors insulated from said metal layer by said dielectric film, the load beam terminal structure comprises left- and right-hand limiter elements configured to limit movement of said flexure distal end relative to said load beam, and/or the load beam terminal structure comprises a lift cam projecting forwardly of the flexure for lifting the load beam relative to the disk.

In the last mentioned embodiment, typically, the flexible conductive laminate flexure has a proximate end and a distal end and comprises a spring metal layer, a dielectric film layer and at least one pair of conductors insulated from the metal layer by the dielectric film, the lift cam extending distally to the flexure distal end, the load beam terminal structure further comprises left- and right-hand limiter elements on either side of the flexure, the limiter elements being configured to overlie the flexure distal end to limit movement of the flexure distal end relative to the load beam, and the terminal structure lift cam extends between the limiter elements.

In a more preferred embodiment, the flexure has a distal end and a proximate end, the load beam terminal structure comprises left- and right-hand parallel fingers bracketing the flexure, the fingers each having an inner portion laterally spaced from the flexure and an outer portion extending at an angle to the inner portion, each the outer finger portion having a terminal portion deflected to overlie the flexure distal end to limit movement of the flexure distal end relative to the load beam.

In this and like embodiments, typically, the load beam terminal structure further comprises a center portion extending between the left- and right-hand fingers, the terminal structure center portion defining a lift cam for lifting the load beam relative to the disk, the lift cam comprising a terminal section of the load beam curled on itself to have a curved outer surface in cam defining relation, the flexible conductive laminate flexure comprises a spring metal layer, a dielectric film layer and at least one pair of conductive elements insulated from the metal layer by the dielectric film, the lift cam extending distally to the flexure distal end, the flexure comprises a perimetrical frame and central tongue formed of the flexible conductive laminate, the tongue having a distal end attached to the frame distal end and a proximate end free of attachment to the frame, the tongue proximate end being configured to intercept the frame upon a predetermined movement of the tongue to block undue excursions of the tongue relative to the frame, and there is included also a slider supported by the tongue, the slider being electrically coupled to the conductor.

In a further embodiment, the disk drive suspension flexure comprises a perimetrical frame and central tongue formed of the flexible conductive laminate, the tongue having a distal end attached to the frame distal end and a proximate end free of attachment to the frame, the tongue proximate end being configured to intercept the frame upon a predetermined movement of the tongue to block undue excursions of the tongue relative to the frame.

In a still further embodiment, the conductor comprises a first flexible conductive laminate comprising a dielectric film and at least one pair of conductive elements, and a second flexible conductive laminate comprising a spring metal layer, a dielectric film, and at least one pair of conductive elements electrically coupled to the first flexible conductive laminate conductive elements, the second flexible conductive laminate defining the flexure.

In this and like embodiments, typically, the first flexible conductive laminate conductive elements extend from the proximate end of the load beam up to the load beam terminal structure, the second flexible conductor conductive elements extending from the terminus of the first flexible conductor to the slider, the second flexible conductor spring metal defining the flexure, the load beam attachment structure comprises a mounting hole defined in the load beam proximate end, the actuator spindle being received within the mounting hole in fixed relation, the load beam terminal structure comprises left- and right-hand limiter elements configured to limit movement of the flexure distal end relative to the load beam, the load beam terminal structure comprises a lift cam projecting forwardly of the flexure for lifting the load beam relative to the disk, the lift cam extending distally to the flexure distal end, the terminal structure lift cam extends between the limiter elements, the load beam terminal structure lifter elements comprise left- and right-hand parallel fingers bracketing the flexure, the fingers each having an inner portion laterally spaced from the flexure and an outer portion extending at an angle to the inner portion, each the outer finger portion having a terminal portion deflected to overlie the flexure distal end to limit movement of the flexure distal end relative to the load beam, the load beam terminal structure lift cam comprises a terminal section of the load beam curled on itself to have a curved outer surface in cam defining relation, the lift cam extending distally to the flexure distal end, the flexure comprises a perimetrical frame and central tongue formed of the spring metal layer of the second flexible conductive laminate, the tongue having a distal end attached to the frame distal end and a proximate end free of attachment to the frame, the tongue proximate end being configured to intercept the frame upon a predetermined movement of the tongue to block undue excursions of the tongue relative to the frame, and there is also included a slider supported by the tongue, the slider being electrically coupled to the conductor.

BRIEF DESCRIPTION OF THE DRAWINGS

The invention will be further described in conjunction with the attached drawings in which:

FIG. 6 is a fragmentary plan view, greatly enlarged, of the suspension load beam terminal structure;

FIG. 7 is a side elevation view thereof; and,

FIG. 8 is a view taken on line 8—8 in FIG. 6.

DETAILED DESCRIPTION

Figure 1:
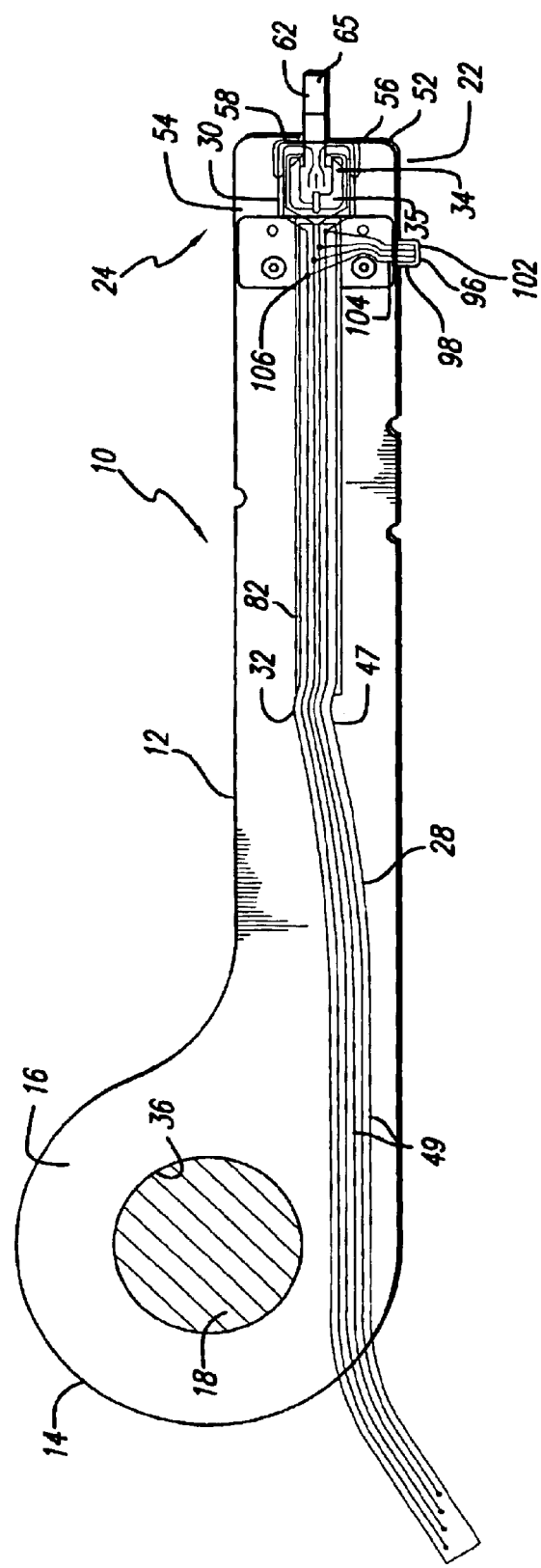
FIG. 1 is a plan view of the invention suspension.
Figure 2:
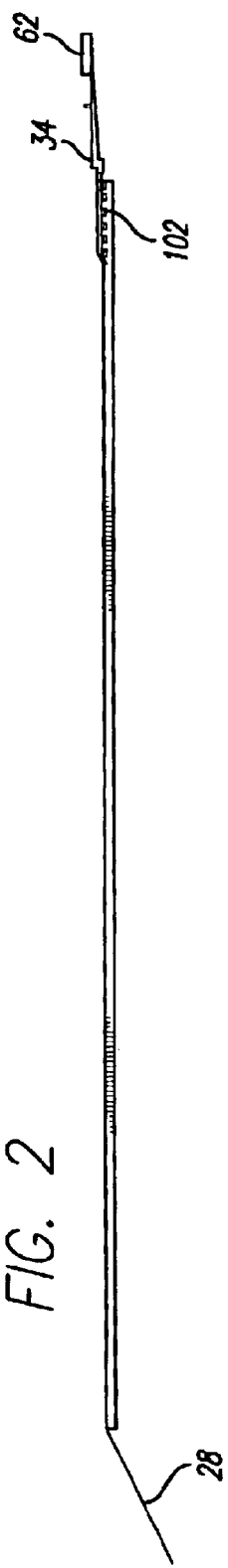
FIG. 2 is a side elevation view thereof.

The invention provides an Important advance toward the optimum low cost disk drive suspension. The disclosed suspension load beam replaces the actuator arm, or E-Block arms, that are widely used in disk drives. The load beam is mounted directly to the disk drive actuator or spindle. The design allows tooling features to be added for HGA/HAD assembly and as a locator for a head protector used during HGA/HAS assembly to protect the head during assembly process steps. The provision of a recessed channel in the load beam allows a flexible circuit laminate to lie below the beam profile for better disk clearance. The use of lower cost flex circuit conductors where possible enables reduced costs over integrated circuit technology conductors such as trace assemblies. Where trace assemblies are used they are small in area, and thus cheaper to buy or build, and the density of the small parts is greater in manufacturing, equaling more parts per unit area. An ESD shunt can be built in, with an integral shorting bar as shown. The load beam has both leading and trailing edge limiters for both load-unload and high shock applications, as well as a centerline lifter for loading and unloading the head from the disk.

With reference to the drawings, in FIGS. 1–8, the several cost-saving and performance-enhancing features noted are realized in the disk drive suspension 10 comprising a load beam 12 having at its proximate end 14 attachment structure 16 fixed to an actuator spindle 18. At its distal end 22, the load beam 12 has terminal structure 24 adapted to support a slider 26 overlying a disk (not shown). Conductor 28 is supported by the load beam and comprises at the terminal structure 24 a metal layer-containing first flexible conductive laminate 30 comprising a spring metal layer 44, a dielectric film layer 46 and at least one pair of electrical conductors 48. Conductor 28 rearward of the terminal structure 24 comprises a second flexible conductive laminate 32 comprising only a dielectric film layer 47 and electrical conductors 49 electrically connected to electrical conductors 48 The first flexible conductive laminate 30 is shaped to define a flexure 34 in the center gap 35 at the load beam terminal structure 24.

The load beam attachment structure 16 comprises a mounting hole 36 defined in the load beam proximate end 14, the actuator spindle 18 being received within the mounting hole in fixed relation.

The flexure 34 has a proximate end 38 and a distal end 42 and comprises the spring metal layer 44 portion of the first flexible conductive laminate 30.

Figure 3:
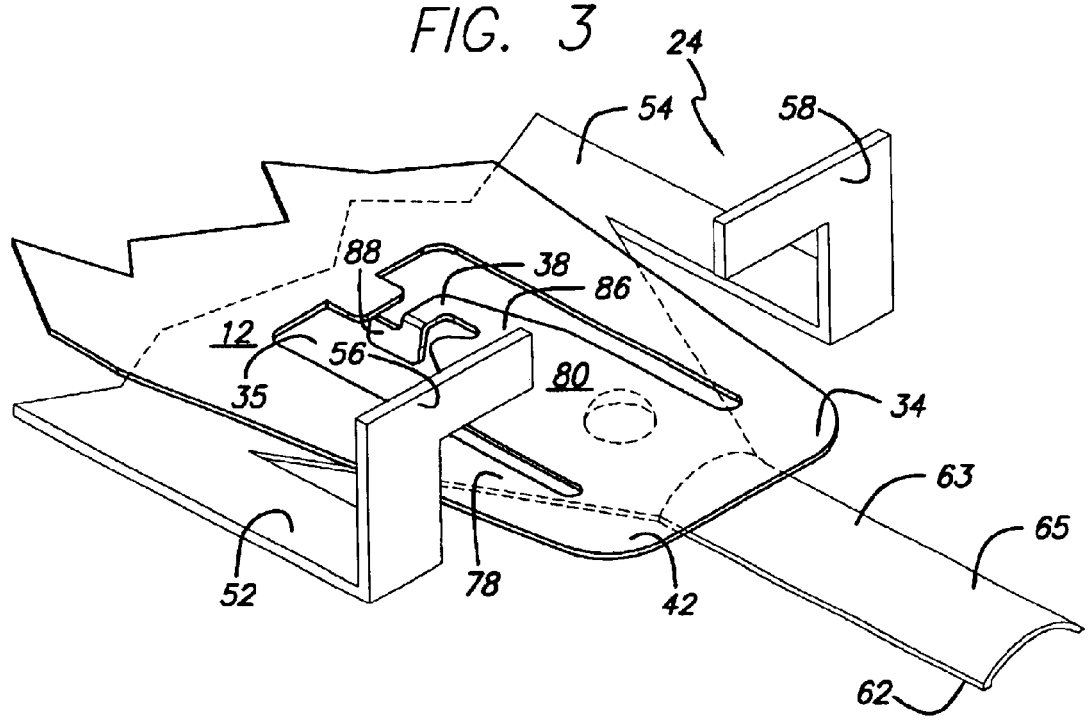
FIG. 3 is an oblique view of the suspension load beam terminal structure.
Figure 4:
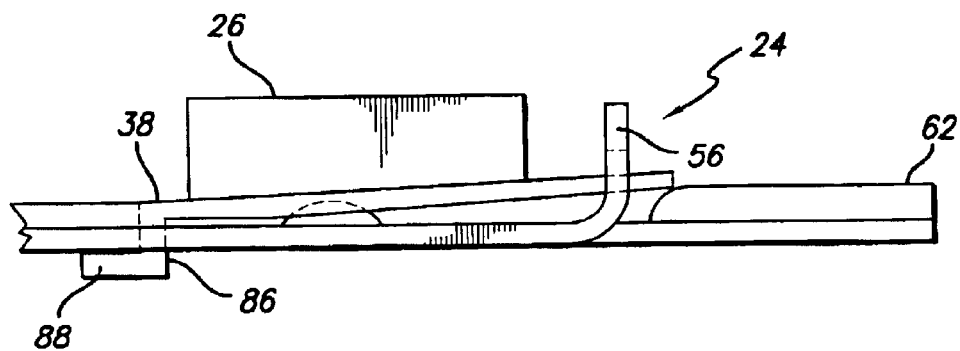
FIG. 4 is a side elevation view thereof.
Figure 5:
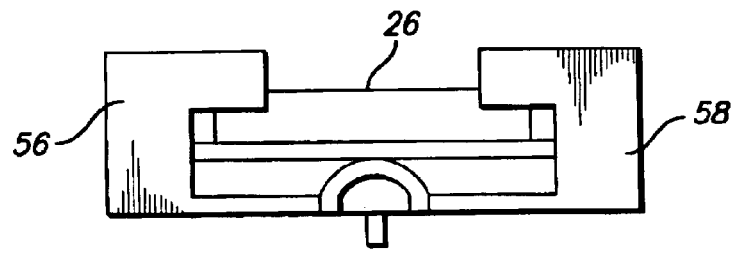
FIG. 5 is an end elevation view thereof.

The load beam terminal structure 24 comprises left- and right-hand limiter elements 52, 54 configured to limit movement of the flexure distal end 42 relative to the load beam 12. The limiter elements 52, 54 are configured as best shown in FIG. 3 to bend about 90° to the plane of the load beam 12, the limiter elements being shaped to overlie with limiter element terminals 56, 58 the flexure distal end 42. This arrangement limits movement of the flexure distal end 42 relative to the load beam 12, particularly in load and unload operations effected with the lift cam 62. Lift cam 62 is formed of the same web as the load beam 12 and is shaped shown to project forwardly of the flexure 34, to extend centrally of the load beam (so as to provide a centerline lift for the load beam) and between the limiter elements 52, 54, and to extend distally to the flexure distal end 42. The lift cam 62 thus comprises a terminal section 63 of the load beam 12 curled on itself to have a curved outer surface 65 in cam defining relation.

Thus, the load beam terminal structure 24 defines a frame generally circumscribing the flexure 34 in which the left- and right-hand elements 52, 54 extend from respectively left- and right-hand parallel fingers 64, 66 integral with the load beam web and bracketing the flexure 34, so that the fingers each have an inner portion 68, 72, respectively, that is laterally spaced from the flexure and an outer portion 74, 76, respectively, defining the limiter elements 52, 54 that extend at the indicated angle to the inner portions 64, 66. The outer finger portions 74, 76 define the limiter element terminals 56, 58 that are deflected to overlie the flexure distal end 42, thereby to limit movement of the flexure distal end relative to the load beam 12.

As noted above, the second flexible conductive laminate 32 extends generally the length of the load beam 12 up to the load beam terminal structure 24, partially disposed in the load beam recess 82 to better clear the disk (not shown). The first flexible conductive laminate 30 is connected to the second flexible conductive laminate 32 at about the start of the load beam terminal structure 24.

The flexure 34 comprises a perimetrical frame 78 and centrally a tongue 80 both formed of the spring metal layer 44 portion of the first flexible conductive laminate 30. Flexure tongue 80 has a distal end 81 attached to the frame distal end 84 and a proximate end 86 free of attachment to the frame. The tongue proximate end 86 has limiter structure 88 formed thereon configured to intercept the flexure frame 78 upon a predetermined movement of the tongue 80 to block undue excursions of the tongue relative to the frame. Slider 26 is supported by the tongue 80, the slider being electrically coupled to the first conductive laminate electrical conductor 48 via contact pads 94.

As mentioned above, the invention offers a built-in electrostatic discharge (ESD) shunt. With reference to FIGS. 1 and 6, the ESD shunt is shown at 96 and comprises the tab 98 having a series of contacts 102 and conductors 104 running from the contacts to the electrical conductors 49 via contacts. 106. The shunt 96 is used to short the electrical conductors 49 during suspension assembly and testing operations as is known, and is removed when no longer needed.

The invention thus provides a novel disk drive suspension that simplifies assembly, reduces per-part costs, and is full featured. The invention suspension load beam attaches directly to the actuator spindle, supports a flexure formed of from a flexible conductive laminate, provides fore and aft flexure limiters, and features a centerline end lift cam integrated with the load beam.

We claim:

1. A disk drive suspension comprising a load beam comprising at its proximate end attachment structure fixed to an actuator spindle and at its distal end terminal structure adapted to support a slider overlying a disk, a conductor supported by the load beam, the conductor comprising a flexible conductive laminate of a spring metal layer, a dielectric film layer and at least one pair of conductors insulated from said metal layer by said dielectric film, said spring metal layer defining a flexure at said load beam terminal structure, and a shunt comprising shunt conductors connected to said conductors and supported on a tab projecting from said flexible conductive laminate.

2. A disk drive suspension comprising a load beam formed from a single web of metal having a proximate end and a distal end, said load beam having at said proximate end attachment structure fixed directly to an actuator spindle and at said distal end terminal structure adapted to support a slider overlying a disk, and a conductor supported by the load beam, the conductor comprising a flexible conductive laminate of a spring metal layer, a dielectric film layer and at least one pair of conductors insulated from said metal layer by said dielectric film, said spring metal layer defining a flexure at said load beam terminal structure.

3. The disk drive suspension according to claim 2, in which said load beam attachment structure comprises a mounting hole defined in said load beam proximate end, said actuator spindle being received within said mounting hole in fixed relation.

4. The disk drive suspension according to claim 2, in which said flexure and load beam are separately formed.

5. The disk drive suspension according to claim 2, in which said load beam terminal structure comprises left- and right-hand limiter elements configured to limit movement of said flexure distal end relative to said load beam.

6. The disk drive suspension according to claim 2, in which said load beam terminal structure comprises a lift cam projecting forwardly of said flexure for lifting said load beam relative to said disk.

7. The disk drive suspension according to claim 6, in which said flexible conductive laminate flexure has a proximate end and a distal end, said lift cam extending distally to said flexure distal end.

8. The disk drive suspension according to claim 7, in which said load beam terminal structure further comprises left- and right-hand limiter elements on either side of said flexure, said limiter elements being configured to overlie said flexure distal end to limit movement of said flexure distal end relative to said load beam.

9. The disk drive suspension according to claim 8, in which said terminal structure lift cam extends between said limiter elements.

10. The disk drive suspension according to claim 2, in which said flexure has a distal end and a proximate end, said load beam terminal structure comprises left- and right-hand parallel fingers bracketing said flexure, said fingers each having an inner portion laterally spaced from said flexure and an outer portion extending at an angle to said inner portion, each said outer finger portion having a terminal portion deflected to overlie said flexure distal end to limit movement of said flexure distal end relative to said load beam.

11. The disk drive suspension according to claim 10, in which said load beam terminal structure further comprises a center portion extending between said left- and right-hand fingers, said terminal structure center portion defining a lift cam for lifting said load beam relative to said disk, said lift cam comprising a terminal section of said load beam curled on itself to have a curved outer surface in cam defining relation.

12. The disk drive suspension according to claim 11, in which said lift cam extends distally to said flexure distal end.

13. The disk drive suspension according to claim 12, in which said flexure comprises a perimetrical frame and central tongue formed of said flexible conductive laminate, said tongue having a distal end attached to said frame distal end and a proximate end free of attachment to said frame, said tongue proximate end being configured to intercept said frame upon a predetermined movement of said tongue to block undue excursions of said tongue relative to said frame.

14. The disk drive suspension according to claim 13, including also a slider supported by said tongue, said slider being electrically coupled to said conductor.

15. The disk drive suspension according to claim 2, in which said flexure comprises a perimetrical frame and central tongue formed of said flexible conductive laminate metal layer, said tongue having a distal end attached to said frame distal end and a proximate end free of attachment to said frame, said tongue proximate end being configured to intercept said frame upon a predetermined movement of said tongue to block undue excursions of said tongue relative to said frame.

16. A disk drive suspension comprising a load beam formed from a single web of metal having at its proximate end attachment structure fixed directly to an actuator spindle and at its distal end terminal structure adapted to support a slider overlying a disk, and a conductor supported by the load beam, said conductor comprising a first flexible conductive laminate comprising a spring metal layer, a dielectric film layer and at least one pair of conductive elements insulated from said metal layer by said dielectric film, said spring metal layer defining a flexure at said load beam terminal structure, said conductor further comprising a second flexible conductive laminate free of a spring metal layer and comprising a dielectric film and at least one pair of conductive elements electrically coupled to said first flexible conductive laminate conductive elements.

17. The disk drive suspension according to claim 16, in which said second flexible conductive laminate extends from the proximate end of said load beam up to a terminus at said load beam terminal structure, said first flexible conductor conductive elements extending from said terminus to said slider.

18. The disk drive suspension according to claim 17, in which said load beam attachment structure comprises a mounting hole defined in said load beam proximate end, said actuator spindle being received within said mounting hole in fixed relation.

19. The disk drive suspension according to claim 18, in which said load beam terminal structure comprises left- and right-hand limiter elements configured to limit movement of said flexure distal end relative to said load beam.

20. The disk drive suspension according to claim 19, in which said load beam terminal structure comprises a lift cam projecting forwardly of said flexure for lifting said load beam relative to said disk, said lift cam extending distally to said flexure distal end.

21. The disk drive suspension according to claim 20, in which said terminal structure lift cam extends between said limiter elements.

22. The disk drive suspension according to claim 21, in which said load beam terminal structure limiter elements comprise left- and right-hand parallel fingers bracketing said flexure, said fingers each having an Inner portion laterally spaced from said flexure and an outer portion extending at an angle to said inner portion, each said outer finger portion having a terminal portion deflected to overlie said flexure distal end to limit movement of said flexure distal end relative to said load beam.

23. The disk drive suspension according to claim 22, in which said load beam terminal structure lift cam comprises a terminal section of said load beam curled on itself to have a curved outer surface in cam defining relation, said lift cam extending distally to said flexure distal end.

24. The disk drive suspension according to claim 23, in which said flexure comprises a perimetrical frame and central tongue formed of the spring metal layer of said first flexible conductive laminate, said tongue having a distal end attached to said frame distal end and a proximate end free of attachment to said frame, said tongue proximate end being configured to intercept said frame upon a predetermined movement of said tongue to block undue excursions of said tongue relative to said frame.

25. The disk drive suspension according to claim 24, including also a slider supported by said tongue, said slider being electrically coupled to said conductor.

* * * * *